United States Patent
Fukui

(10) Patent No.: US 9,236,727 B2
(45) Date of Patent: Jan. 12, 2016

(54) CURRENT MODE STEP-DOWN SWITCHING REGULATOR

(75) Inventor: Atsuo Fukui, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 11/127,009

(22) Filed: May 11, 2005

(65) Prior Publication Data

US 2005/0254184 A1    Nov. 17, 2005

(30) Foreign Application Priority Data

May 12, 2004 (JP) ................. 2004-141884

(51) Int. Cl.
  *H02H 7/00* (2006.01)
  *H02H 7/12* (2006.01)
  *H02M 3/156* (2006.01)
  *H02M 1/00* (2007.01)

(52) U.S. Cl.
  CPC ............ *H02H 7/1213* (2013.01); *H02M 3/156* (2013.01); *H02M 2001/0025* (2013.01)

(58) Field of Classification Search
  CPC ....... H02H 7/00; H02H 7/1213; H02M 3/156; H02M 3/1563; H02M 2001/0025–2001/0038
  USPC ......... 323/222, 276, 277, 283, 284, 901, 908; 361/93.1, 93.2, 93.9
  See application file for complete search history.

(56) References Cited

U.S. PATENT DOCUMENTS

| 5,550,702 | A | * | 8/1996 | Schmidt et al. | ............... 361/93.8 |
| 6,005,785 | A | * | 12/1999 | Kudou | ..................... H02M 1/32 323/301 |
| 6,911,808 | B1 | * | 6/2005 | Shimamori | ........... H02M 3/157 323/283 |
| 2004/0090804 | A1 | * | 5/2004 | Lipcsei | ................. H02M 3/156 363/41 |

* cited by examiner

*Primary Examiner* — Jessica Han
(74) *Attorney, Agent, or Firm* — Adams & Wilks

(57) ABSTRACT

Provided is a current mode step-down switching regulator which is capable of enhancing over-current limiting characteristics even when an over-current limiting function operates to reduce an output voltage. The current mode step-down switching regulator includes a pulse adjusting circuit. When an over-current is detected, a switching output signal is thinned out by the pulse adjusting circuit to be outputted in order to reduce an apparent oscillation frequency, thereby reducing an influence by response delay in an over-current detecting comparator.

1 Claim, 4 Drawing Sheets

CURRENT MODE STEP-DOWN SWITCHING REGULATOR

BACKGROUND OF THE INVENTION

1. Field of the Invention

The present invention relates in general to a current mode step-down switching regulator, and more particularly to an over-current limiting circuit of a current mode step-down switching regulator.

2. Description of the Related Art

FIG. 6 shows a circuit diagram of an over-current limiting circuit of a conventional current mode step-down switching regulator. A switch 107 serves to supply an input voltage VIN to a coil 109. An error amplifier 101 amplifies a difference between a voltage obtained by dividing an output voltage VOUT at an output terminal 113 with a first resistor 110 and a second resistor 111, and a reference voltage VREF supplied from a reference voltage source 100.

A signal which is obtained by subtracting a correction ramp wave outputted from a slope correcting circuit 102 from an output signal from the error amplifier 101 in a subtracter 103 is inputted to an inverting input terminal of a comparator 104. The correction ramp wave outputted from the slope correcting circuit 102 has a saw-tooth-wave shape as shown in FIG. 6.

A signal which is obtained by converting a current caused to flow through the switch 107 into a voltage is inputted to a noninverting input terminal of the comparator 104. While not illustrated, normally, the current is detected using a sense resistor connected in series with the switch 107. The signal having a value proportional to the current caused to flow through the switch 107 is inputted as voltage information to the noninverting input terminal of the comparator 104.

When the output voltage VOUT is low, an output voltage from the error amplifier 101 increases. Hence, in order that a logical state of the comparator 104 may change from L to H, a voltage signal having a larger value needs to be applied to the noninverting input terminal of the comparator 104. That is, when the output voltage VOUT is low, causing a more current to flow through the switch 107 inverts the output signal from the comparator 104. An output signal from the comparator 104 is inputted to a reset terminal R of an SR-latch 106 through an OR circuit 115.

An oscillator 105 is connected to a set terminal S of the SR-latch 106. A pulse signal having a fixed period as shown in FIG. 6 is outputted from the oscillator 105. An output terminal Q of the SR-latch 106 is connected to the switch 107. When a voltage level at the output terminal Q of the SR-latch 106 becomes H, the switch 107 is turned ON.

Similarly to the case of the comparator 104, the signal which is obtained by converting the current caused to flow through the switch 107 into the voltage is inputted to a noninverting input terminal of an over-current detecting comparator 114. As described above, normally, the current is detected using the sense resistor connected in series with the switch 107. The signal having the value proportional to the current caused to flow through the switch 107 is also inputted as the voltage information to the noninverting input terminal of the over-current detecting comparator 114.

In addition, a reference voltage source 113 is connected to an inverting terminal of the over-current detecting comparator 114. An output terminal of the over-current detecting comparator 114 is connected to one input terminal of the OR circuit 115. When the current being caused to flow through the switch 107 increases, the voltage inputted to the noninverting input terminal of the over-current detecting comparator 114 increases accordingly. When this voltage becomes higher than the voltage set by the reference voltage source 113, the voltage level of the output signal from the over-current detecting comparator 114 becomes High. Thus, since the OR-latch 106 is reset, the switch 107 is turned OFF. That is, when an operation state becomes an over-current state, the switch 107 is turned OFF. As a result, an over-current limiting function of preventing the current from being caused to flow any more operates.

Upon turn-OFF of the switch 107, the value of the current caused to flow through the switch 107 becomes zero. Thus, since the voltage level of the output signal from the over-current detecting comparator 114 becomes Low, the SR-latch 106 is set with a next pulse outputted from the oscillator 105 to turn ON the switch 107. When the current caused to flow through the switch 107 increases again, the operation is repeatedly carried out in which the voltage level at the noninverting input terminal of the over-current detecting comparator 114 becomes High to turn OFF the switch 107 (refer to a detailed block diagram of a PWM controller (page 14) in a data sheet of a step-down controller, "MAX796/MAX797/MAX799", for a synchronous rectification type CPU power supply manufactured by MAXIM CO., LTD.).

When a load current increases to provide an over-current limiting state, the output voltage VOUT at the output terminal 113 decreases and thus a stable state is obtained. However, since the input voltage VIN at the input terminal 117 is constant, Duty of a signal used to control the switch 107 becomes small. Duty is practically determined by the following equation:

$$Duty = VOUT/VIN$$

When Duty becomes small, an influence by response delay in the comparator 104 and the over-current detecting comparator 114 to Duty becomes large. FIG. 7 shows a relationship between a load current IOUT caused to flow through a load 116 connected to the output terminal 113, and the output voltage VOUT. When the load current IOUT exceeds an over-current detection level indicated by a point A, the over-current control function operates to make the output voltage VOUT 0 V. If a delay time of the comparator is zero, Duty is practically determined based on the equation of Duty=VOUT/VIN. However, in practice, the comparator has a delay time, and the delay time exerts an influence on Duty. When Duty (Duty time) determined by VOUT/VIN is large, the delay time in the comparator can be disregarded. However, when Duty becomes small, the influence by the delay time in the comparator cannot be disregarded. In the case of the conventional circuit shown in FIG. 6, there is encountered a problem in that when the output voltage VOUT is low, Duty cannot be reduced to a level equal to or smaller than the delay time in some cases due to the influence by the response delay of the comparator, and hence the over-current limiting function cannot operate.

The response delay in the comparator is constant irrespective of an oscillation frequency of the saw-tooth-wave outputted by the slope correcting circuit 102. Consequently, when the oscillation frequency becomes high, the influence by the delay time in the comparator becomes large similarly to the case where Duty becomes small. When the current limiting function does not operate, there arises a problem in that the current caused to flow into the coil 109 and the current caused to flow through the switching element 107 cannot be limited. Also, when the current exceeds an allowable current value, it becomes impossible to obtain the original inductance value. Moreover, when a MOSFET is used in the switching element 107, the MOSFET is heated.

SUMMARY OF THE INVENTION

To solve the above-mentioned problem, according to the present invention, there is provided a current mode step-down switching regulator including an over-current detecting circuit, for changing a switching output signal based on an over-current detection signal from the over-current detecting circuit including a pulse adjusting circuit for receiving as its input the over-current detection signal from the over-current detecting circuit, in which in an over-current state, the switching output signal is thinned out by the pulse adjusting circuit to be outputted.

Further, the pulse adjusting circuit includes an SR-latch circuit, and an arbitrary number of pulses are thinned out which are inputted to a set terminal of the SR-latch circuit right after a pulse is outputted from the over-current detecting circuit in the over-current state.

According to the present invention constituted as described above, there is offered an effect equivalent to that in a case where the oscillation frequency is reduced in an over-current state. Thus, it becomes possible to reduce an influence by response delay in a comparator.

An oscillation frequency of an oscillator is reduced in an over-current state based on an output signal from the comparator for detecting the over-current state to reduce an influence by response delay in an over-current detecting comparator, whereby even when an over-current limiting function operates to reduce an output voltage, over-current limiting characteristics can be enhanced.

DESCRIPTION OF THE PREFERRED EMBODIMENTS

An arbitrary number of pulses are skipped which are inputted to a set terminal of an SR-latch right after a pulse is outputted from an over-current detecting comparator in an over-current state, whereby there is offered an effect equivalent to a case where an oscillation frequency is reduced, and thus an influence by response delay in an over-current detecting comparator is reduced, and thus over-current limiting characteristics when an output voltage VOUT is low are enhanced.

An embodiment of the present invention will hereinafter be described with reference to the accompanying drawings.

Figure 1:
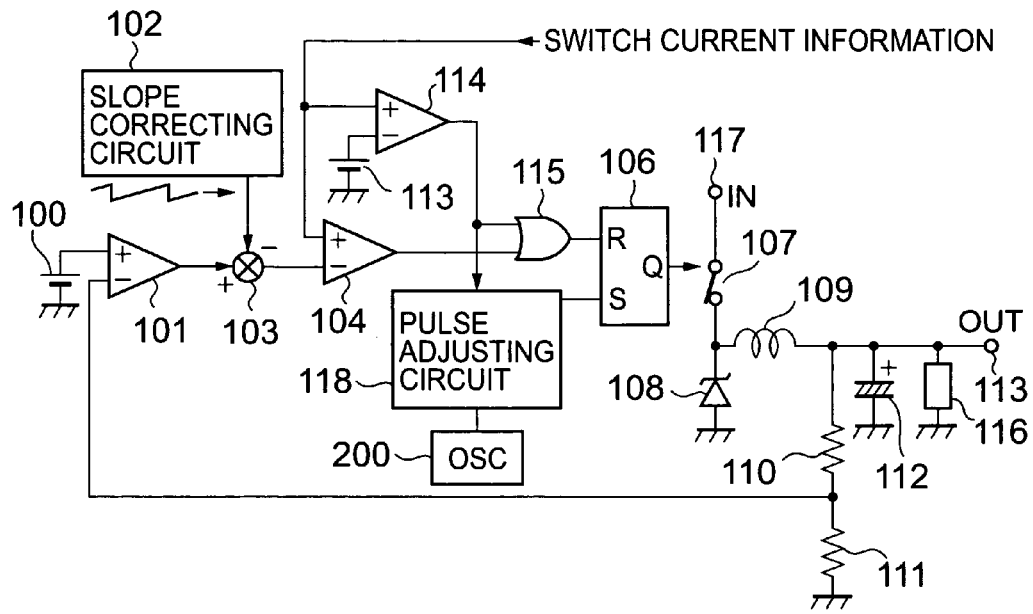
FIG. 1 is a circuit diagram showing a construction of a current mode step-down switching regulator according to an embodiment of the present invention.

FIG. 1 is a circuit diagram showing a construction of a current mode step-down switching regulator according to an embodiment of the present invention.

A switch 107 serves to a supply an input voltage VIN to a coil 109. An error amplifier 101 amplifies a difference between a voltage obtained by dividing an output voltage VOUT at an output terminal 113 with a first resistor 110 and a second resistor 111, and a reference voltage VREF supplied from a reference voltage source 100.

Figure 6:
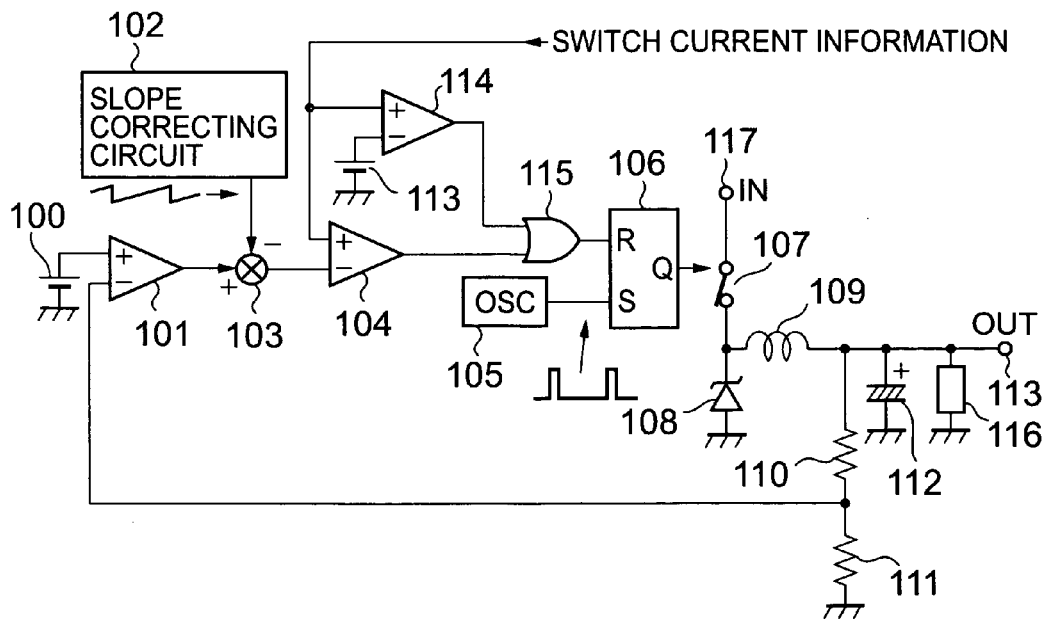
FIG. 6 is a circuit diagram showing a construction of a conventional current mode step-down switching regulator.

A signal which is obtained by subtracting a correction ramp wave outputted from a slope correcting circuit 102 from an output signal from the error amplifier 101 in a subtracter 103 is inputted to an inverting input terminal of a comparator 104. The correction ramp wave outputted from the slope correcting circuit 102 has a saw-tooth-wave shape as shown in FIG. 6.

A signal which is obtained by converting a current caused to flow through the switch 107 into a voltage is inputted to a noninverting input terminal of the comparator 104. While not illustrated, normally, the current is detected using a sense resistor connected in series with the switch 107. The signal having a value proportional to the current caused to flow through the switch 107 is inputted as voltage information to the noninverting input terminal of the comparator 104.

When the output voltage VOUT is low, an output voltage from the error amplifier 101 increases. Hence, in order that a logical state of the comparator 104 may change from L to H, a voltage signal having a larger value needs to be applied to the noninverting input terminal of the comparator 104. That is, when the output voltage VOUT is low, causing a more current to flow through the switch 107 inverts the output signal from the comparator 104. An output signal from the comparator 104 is inputted to a reset terminal R of an SR-latch 106 through an OR circuit 115.

Similarly to the case of the comparator 104, the signal which is obtained by converting the current caused to flow through the switch 107 into the voltage is inputted to a noninverting input terminal of an over-current detecting comparator 114. As described above, normally, the current is detected using the sense resistor connected in series with the switch 107. The signal having the value proportional to the current caused to flow through the switch 107 is also inputted as the voltage information to the noninverting input terminal of the over-current detecting comparator 114.

In addition, a reference voltage source 113 is connected to an inverting terminal of the over-current detecting comparator 114. An output terminal of the over-current detecting comparator 114 is connected to one input terminal of the OR circuit 115.

Moreover, an output signal from the over-current detecting comparator 114 is inputted to a pulse adjusting circuit 118 to change an output signal from the oscillator 200, whereby an arbitrary number of pulses inputted to a set terminal S of the SR-latch 106 are skipped when an over-current is caused.

An output terminal Q of the SR-latch 106 is connected to the switch 107. Thus, when a logical level at the output terminal Q of the SR-latch 106 becomes H, the switch 107 is turned ON.

When a set pulse which is inputted to the set terminal S of the SR-latch 106 right after a pulse is outputted from the over-current detecting comparator 114 is skipped by one for example, there is offered an effect equivalent to a case where the oscillation frequency is reduced. Hence, an influence by the response delay in the comparator is reduced.

Figure 2:
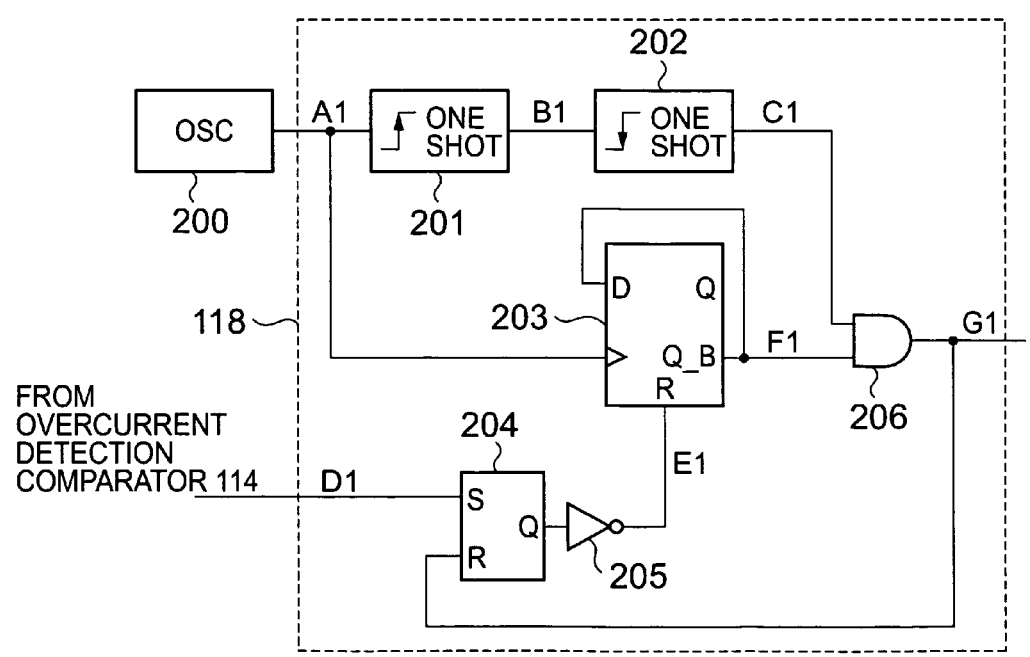
FIG. 2 is a circuit diagram showing a detailed construction of an example of a pulse adjusting circuit of the current mode step-down switching regulator of the present invention.

FIG. 2 shows an example of the pulse adjusting circuit 118. An output signal from an oscillator 200 is inputted to a one-shot multi vibrator 201 adapted to react to a leading edge of a pulse. An output signal from the one-shot multi vibrator 201 is inputted to a one-shot multi vibrator 202 adapted to react to a trailing edge of a pulse. An output signal from the one-shot multi vibrator 202 is inputted to one input terminal of an AND circuit 206.

In addition, the output signal from the oscillator 200 is also inputted to a clock terminal of a D-type flip-flop 203. An output signal from a Q_B terminal of the D-type flip-flop 203 is inputted to each of a data terminal D of the D-type flip-flop 203 and the other input terminal of the AND circuit 206.

The output terminal of the over-current detecting comparator 114 shown in FIG. 1 is connected to a set terminal S of an SR-latch 204. An output terminal of the AND circuit 206 is connected to a reset terminal R of the SR-latch 204. An output terminal of the SR-latch 204 is connected to a reset terminal R of the D-type flip-flop 203 through an inverter 205.

The output terminal of the AND circuit 206 is connected to the set terminal S of the SR-latch 106 shown in FIG. 1.

Figure 3:
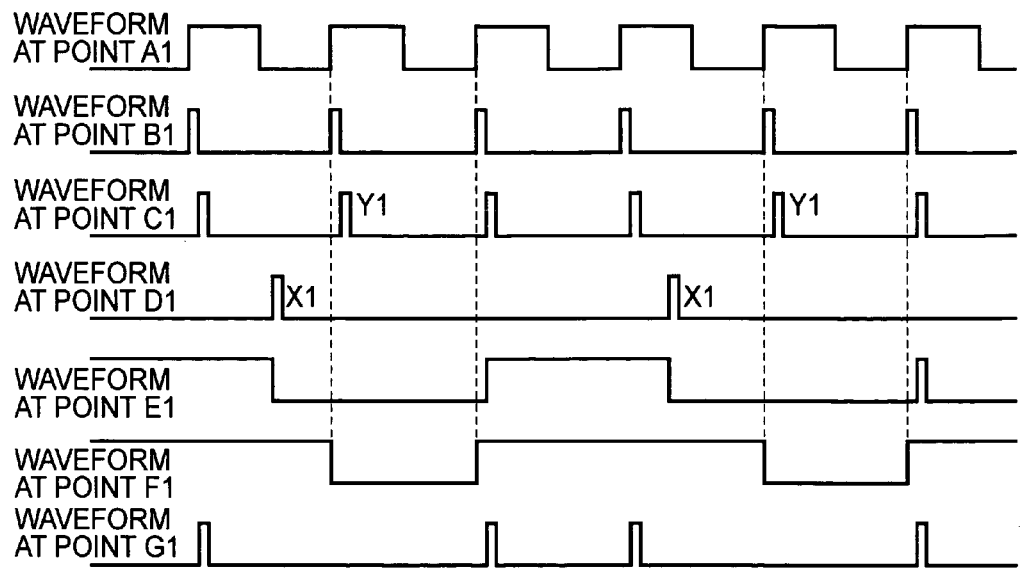
FIG. 3 is a waveform chart showing waveforms in portions of the pulse adjusting circuit shown in FIG. 2.

FIG. 3 shows waveforms in points A1 to G1 shown in FIG. 2. Upon input of a pulse signal (having a waveform X1 in the point D1) from the over-current detecting comparator 114 to the set terminal S of the SR-latch 204, an output signal to the reset terminal R of the D-type flip-flop 203 changes. As a result, the output signal from the D-type flip-flop 203 changes, and thus the output signal from the over-current multi vibrator 202 is not outputted from the AND circuit 206 for this period of time (a waveform Y1 in the point C1). Consequently, a pulse signal is outputted in which one pulse is skipped which oughts to be outputted to the set terminal S of the SR-latch 106 (a waveform in the point G1).

Figure 4:
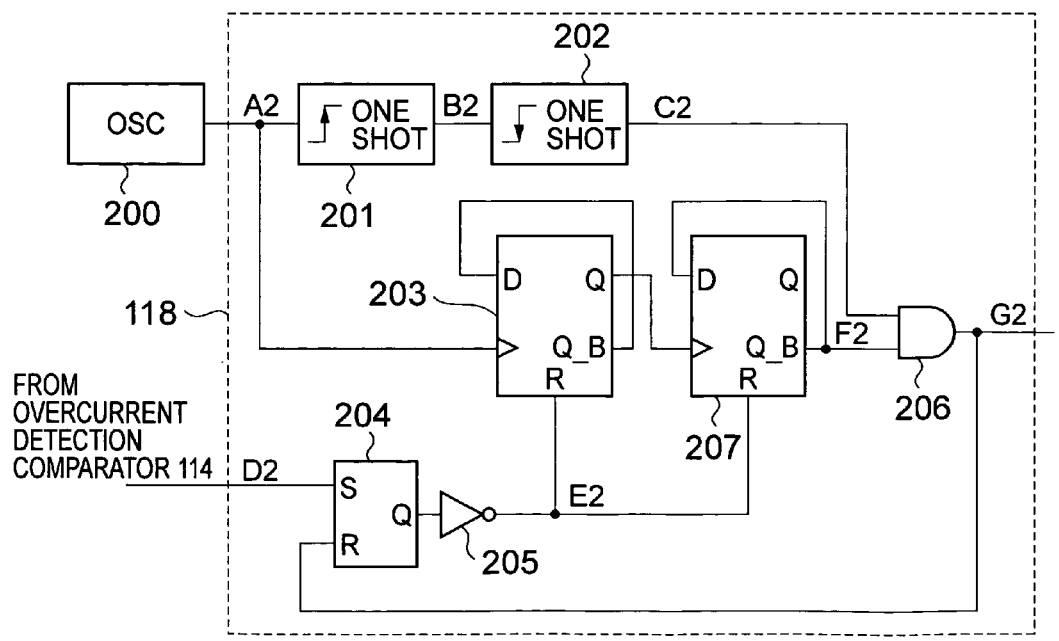
FIG. 4 is a circuit diagram showing a detailed construction of another example of the pulse adjusting circuit of the current mode step-down switching regulator of the present invention.
Figure 5:
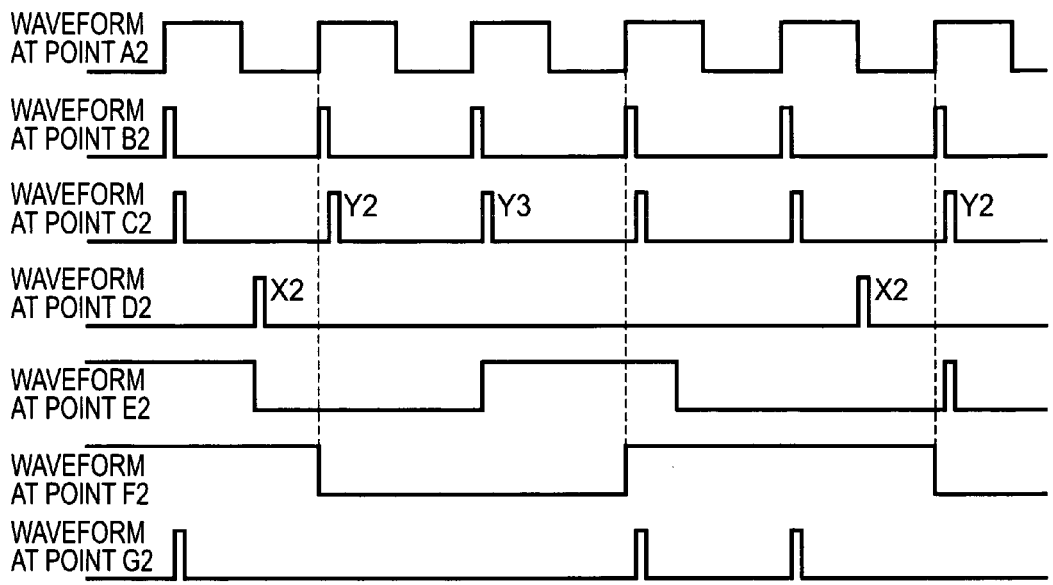
FIG. 5 is a waveform chart showing waveforms in portions of the pulse adjusting circuit shown in FIG. 4.

FIG. 4 shows another example of the pulse adjusting circuit 118 in which a D-type flip-flop 207 is added to the circuit shown in FIG. 2. An output terminal Q of the D-type flip-flop 203 is connected to a clock terminal of the D-type flip-flop 207. An output terminal of the inverter 205 is connected to a reset terminal R of the D-type flip-flop 207. An output terminal Q_B of the D-type flip-flop 207 is connected to a data terminal D of the D-type flip-flop 207. The output terminal Q_B of the D-type flip-flop 207 is also connected to the AND circuit 206. FIG. 5 shows waveforms in points A2 to G2 at this time.

As can be seen from FIG. 5, upon input of the pulse signal (having a waveform X2 in the point D2) from the over-current detecting comparator 114 to the set terminal S of the SR-latch 204, an output signal to each of the reset terminal R S of the D-type flip-flops 203 and 207 changes. As a result, the output signals from the D-type flip-flops 203 and 207 change, and thus the output signal from the over-current multi vibrator 202 is not outputted from the AND circuit 206 for this period of time (a waveform Y2, Y3 in the point C2). Consequently, a pulse signal is outputted in which two pulses are skipped which oughts to be outputted to the set terminal S of the SR-latch (a waveform in the point G2).

Moreover, it is obvious that the additional provision of the D-type flip-flop 207 makes it possible to increase the skip number of pulses in the pulse signal (a waveform in the point G2) which is inputted to the set terminal S of the SR-latch 106 right after the pulse signal (a waveform in the point D2) is inputted from the over-current detecting comparator 114.

Figure 7:
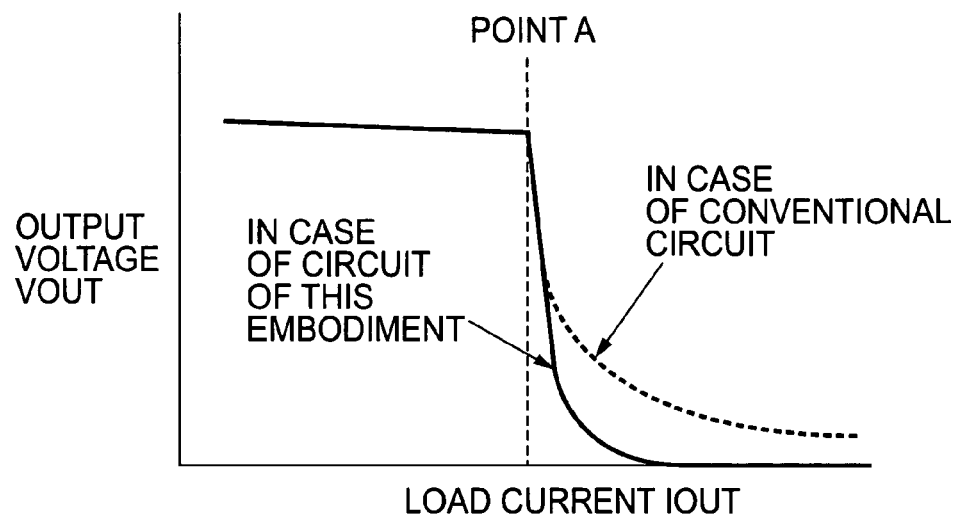
FIG. 7 is a graphical representation showing a relationship between a load current IOUT in an over-current limiting circuit of the conventional current mode step-down switching regulator and an output voltage VOUT, and a relationship between a load current IOUT in an over-current limiting circuit of the current mode step-down switching regulator of the present invention and an output voltage VOUT.

FIG. 7 shows a relationship between a load current IOUT and the output voltage VOUT when the over-current limiting circuit shown in this embodiment is used. It is understood that when the over-current limiting circuit according to this embodiment is used, the over-current limiting function operates, and thus even when the output voltage VOUT is reduced, the over-current limiting characteristics are enhanced as compared with the case of the conventional circuit.

In addition, even in a case of a circuit construction different from each of the circuit constructions of the examples shown in FIGS. 2 and 4, it is possible to obtain the same effects as those in each of the circuit constructions of the examples of the present invention shown in FIGS. 2 and 4 as long as the oscillation frequency can be changed based on the output signal from the over-current detecting comparator 114. Thus, the present invention is not intended to be limited to the circuit constructions shown in FIGS. 2 and 4.

What is claimed is:

1. A current mode step-down switching regulator comprising an over-current detecting circuit, for changing a switching output signal based on an over-current detection signal from the over-current detecting circuit, comprising:
   a pulse adjusting circuit for receiving as its input the over-current detection signal from the over-current detecting circuit,
   wherein in an over-current state, the switching output signal is thinned out by the pulse adjusting circuit to be outputted, and
   wherein the pulse adjusting circuit includes an SR-latch circuit, and an arbitrary number of pulses are thinned out and inputted to a set terminal of the SR-latch circuit right after a pulse is outputted from the over-current detecting circuit in the over-current state.

* * * * *